United States Patent [19]

Stewart

[11] Patent Number: 5,122,400
[45] Date of Patent: Jun. 16, 1992

[54] INFLATABLE ARTICLES AND METHOD OF CREATING INFLATABLE PRODUCTS

[75] Inventor: Keith Stewart, Dorset, United Kingdom

[73] Assignee: Stewkie Limited, Welwyn Garden, United Kingdom

[21] Appl. No.: 476,379

[22] PCT Filed: Nov. 18, 1988

[86] PCT No.: PCT/GB88/01016
§ 371 Date: May 21, 1990
§ 102(e) Date: May 21, 1990

[87] PCT Pub. No.: WO89/04757
PCT Pub. Date: Jun. 1, 1989

[30] Foreign Application Priority Data

Nov. 20, 1987 [GB] United Kingdom ............ 8727166

[51] Int. Cl.⁵ .................. B29D 23/00; B32B 1/08
[52] U.S. Cl. ................... 428/34.7; 428/36.1; 428/36.4; 220/613; 156/69; 156/156; 156/314
[58] Field of Search ............... 156/69, 156, 165, 330, 156/314; 264/314, 257, 258; 220/414, 613; 428/34.7, 36.1, 36.3, 36.4

[56] References Cited

U.S. PATENT DOCUMENTS

| | | | |
|---|---|---|---|
| 3,010,602 | 11/1961 | Randolph | 220/613 X |
| 3,137,898 | 6/1964 | Geringer | 264/314 X |
| 3,161,553 | 12/1964 | Visser | 156/156 |
| 3,282,757 | 11/1966 | Brussee | 156/165 X |
| 3,292,338 | 12/1966 | MacClarence et al. | 264/314 X |
| 3,385,744 | 5/1968 | Van Sciver | 156/330 X |
| 3,654,050 | 4/1972 | Fraser . | |
| 3,657,379 | 4/1972 | Hilbelink et al. | 156/330 X |
| 3,827,094 | 8/1974 | Fisher | 441/41 X |
| 3,837,981 | 9/1974 | Flint | 156/330 X |
| 3,962,506 | 6/1976 | Dunahoo . | |
| 4,132,577 | 1/1979 | Wintermantel | 156/156 |
| 4,144,632 | 3/1979 | Stroupe | 156/156 X |

FOREIGN PATENT DOCUMENTS

| | | |
|---|---|---|
| 661239 | 7/1965 | Belgium . |
| 3312920 | 10/1984 | Fed. Rep. of Germany . |
| 2034205 | 12/1970 | France . |
| 48290 | 5/1965 | Luxembourg . |
| 603332 | 8/1978 | Switzerland . |
| 872827 | 7/1961 | United Kingdom . |
| 2167710 | 6/1986 | United Kingdom . |

Primary Examiner—Michael W. Ball
Assistant Examiner—Jeff H. Aftergut
Attorney, Agent, or Firm—Fiddler & Levine

[57] ABSTRACT

A method of making a repeatedly inflatable and deflatable structure is disclosed wherein an inner envelope (3) of gas impermeable material is at least partially surrounded by a shell (1) of reinforcing material and adhesive (15/15a) is provided between the two and the envelope is expanded to contact the shell and to become adhered thereto by the flexible adhesive.

20 Claims, 6 Drawing Sheets

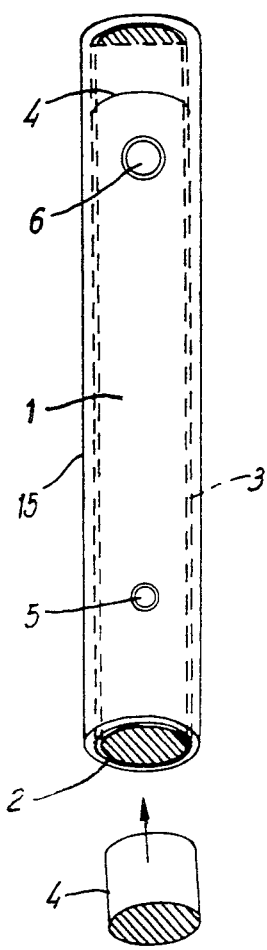
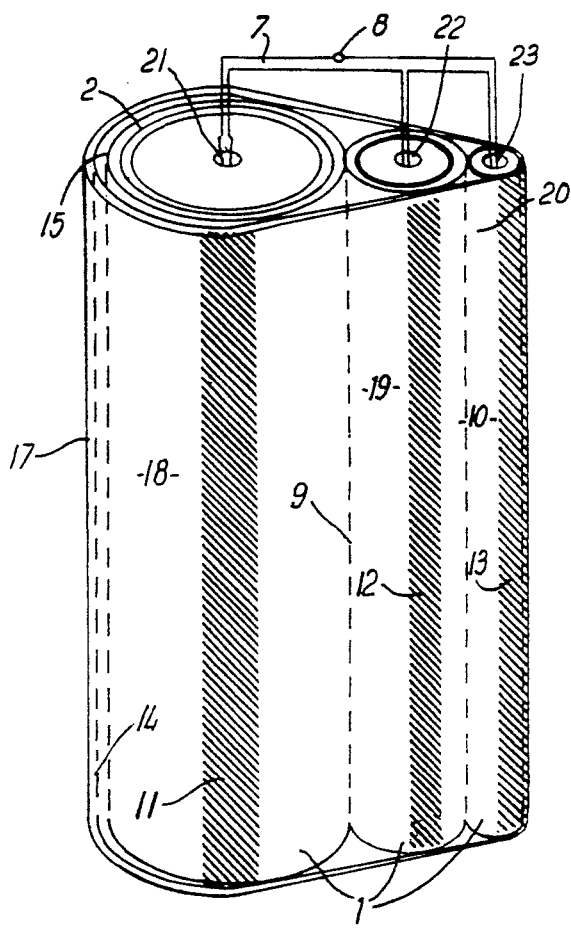
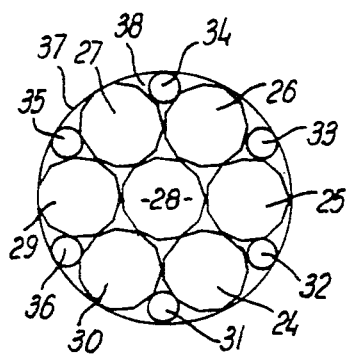
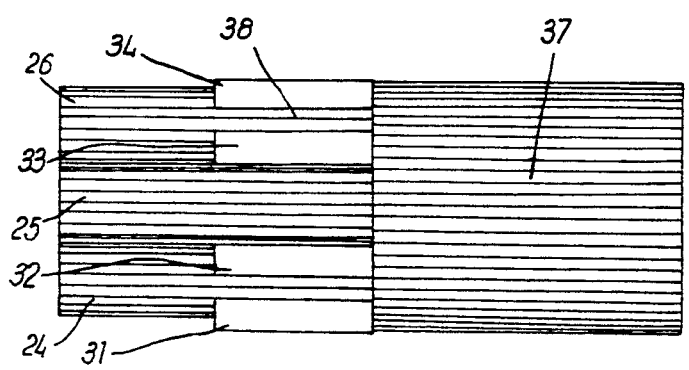

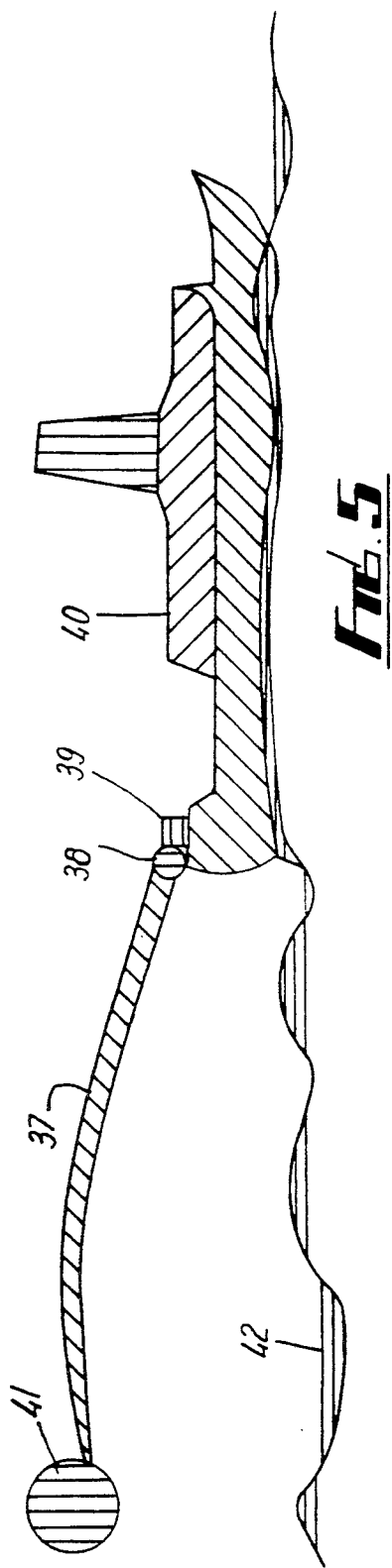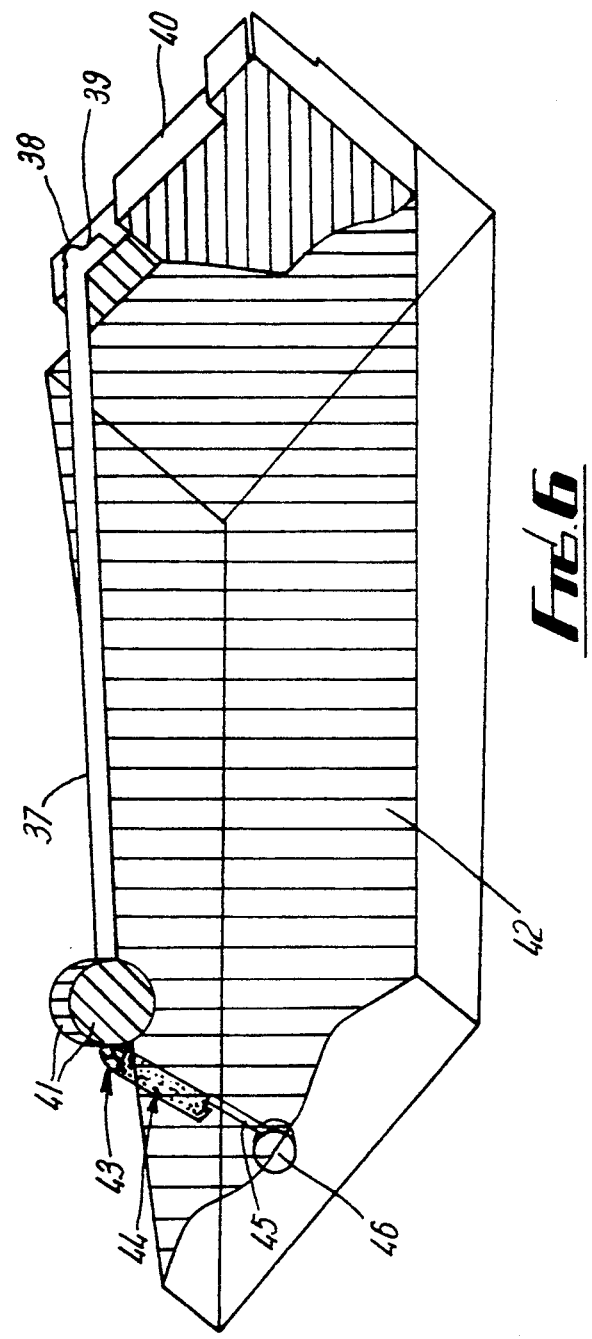

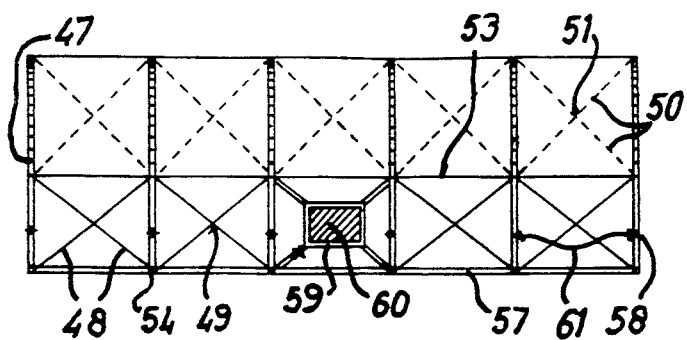
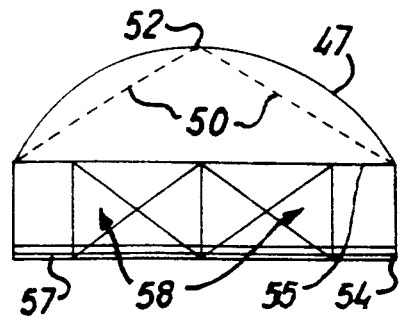
FIG.7  FIG.8
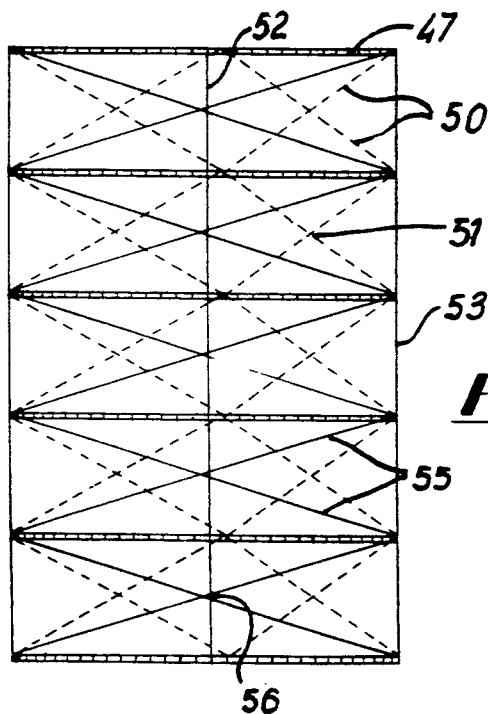
FIG.9
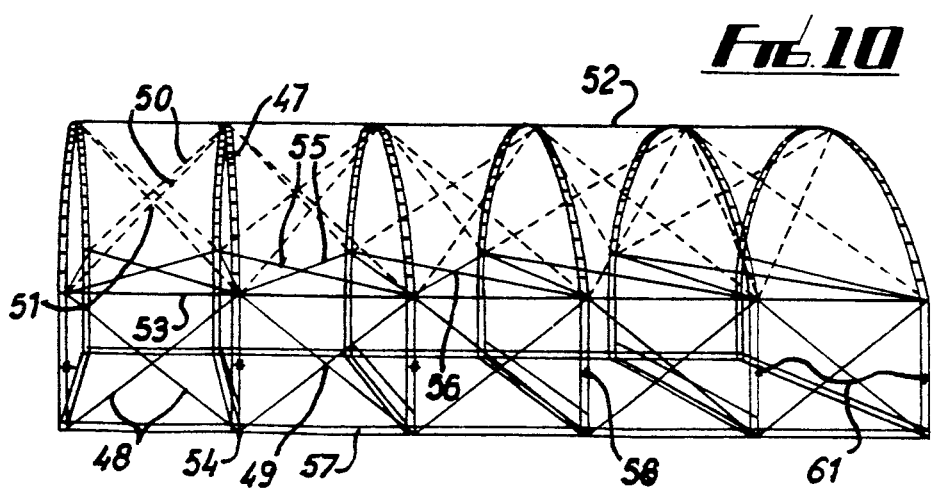
FIG.10

INFLATABLE ARTICLES AND METHOD OF CREATING INFLATABLE PRODUCTS

This invention relates to a novel method of creating an inflatable product with an extremely high compressive and tensile strength which can be deflated to form a very lightweight small package.

In my previous Patent Co-operation Treaty Application No. PCT/GB 86/00757 corresponding to British Patent Application No. 8529049 one of the main purposes (although not the sole purpose) of the patent application was to form an inflatable mould which could be hardened to form a shell or building etc., but which was not capable of being deflated and packed up.

The invention provides a method of making an article including the steps of providing a gas impermeable inflatable envelope, positioning the envelope within an at least partially surrounding shell of reinforcement material, positioning a flexible adhesive between the envelope and the shell, and expanding the envelope to fill the shell to cause the adhesive to form a bond between the envelope and the shell and allowing the adhesive to cure to form a permanent flexible bond between the envelope and the shell; characterised in that said shell includes a body and an end cap; and in that the end cap is secured by positioning it between adjacent end portions of said shell and said envelope and allowing adhesive to unite the cap with the shell body and the envelope whilst the cap is sandwiched therebetween.

The inflatable envelope can be of polyurethane, polyolefin or nylon/polyurethane.

The reinforcement can be of textile material, for example of glass fibre, carbon fibre, an extended chain polyester, (known as Spectra), or aramid (known as Kevlar). The textile material can be woven or non-woven.

In a tubular structure both the envelope and the reinforcement can be in the form of preformed tubes. A highly flexible settable epoxy or polyurethane resin or other chemical which reacts with the envelope and outer reinforcement material can be used not only to unite the envelope and laminate it to the shell but can at the same time stop 'creep' in the reinforcement material. Creep can be a considerable problem in Spectra particularly but also in Kevlar. The flexible settable epoxy or polyurethane resin can also include a flame barrier material to increase the flame retardent qualities of the outer reinforcement material which is particularly important in a material such as Spectra where the melt point is relatively low at 150° C.

The structure made by the invention can be a tube capable of withstanding a higher pressure and greater hoop strength than is possible with the outer reinforcement material on its own by means of the settable material and yet at the same time allowing the product to be deflated and packaged repeatedly without materially affecting the integrity or pressure capability of the tube. The higher pressure so created and the settable material itself gives a higher compressive strength than has been possible before on such lightweight material.

One or more further skins can be added to create a stronger product and the envelope can have an internal ribbed system to create a particular shape. A particular feature of this invention is the capability of forming a rigid sail or mast or aerofoil section by means of tubes outside of which is a further skin of reinforcement material which joins the tubes together to form a particular shape.

The outer reinforcement material can be secured to the tubes, which can be of different sizes and numbers according to the product to be manufactured, but the outer skin need not necessarily have to be inflated and if inflated would generally be of a lower pressure. In certain circumstances (such as in an inflated Flettner rotor) it may be required that one section of a product remains rigid on deflation whereas another section is required to be very flexible.

The settable material can be of a different flexibility for different sections in order to facilitate this requirement.

It is possible to create a more rigid product by inserting reinforcing ribs e.g. composed of glass fibre, carbon fibreglass, Kevlar or plastics such as polycarbonates or metals such as aluminium into pockets on the outer skin which would be firmly locked into position at inflation.

Various items can be manufactured, for example vessel Jury Rigs, emergency rudders, radar reflectors, contra-rotating flying saucers, airships, bridges, pontoons and vessels. These items can be manufactured complete at the factory before shipment in a rolled up or vacuum state and at destination would only have to be inflated to become 'rigidised' rather than have another process carried out away from the factory.

The adhesive can be applied by spraying, painting or dipping.

A product made by the method of the invention can be an inflatable tube, of which a plurality can form various products by way of example an inflatable fascine capable of withstanding the pressure of tanks over 70 tons (66 tonnes). Such a fascine can use a number of tubes in different sizes to form the required size. Each tube typically can be composed of an envelope, e.g. of polyurethane or polyurethane/nylon, with an outer skin of reinforcement such as fibres of Spectra which has good abrasion resistance and high tensile strength.

Typically seven tubes of 300 mm diameter are joined together with a further six tubes of 107 mm diameter filling in the gaps on the outside periphery. A surround of Spectra can enclose the whole to form a fascine of size 1.80 m diameter $\times$ 4.57 m length with a coupled inflation manifold allowing inflating to over 60 PSI. ($4.2 \times 10^5 Nm^{-2}$).

Another example of a tube system is an inflated decoy for sea, air and land use, easier to deploy and retrieve than previously.

In the case of land vehicles or aircraft a standard foldable passive radar reflector decoy can by way of example be deployed a few meters from a vulnerable area of the tank by means of a tube or tubes of the invention which is/are inflated within a few seconds by means of a pressure vessel. It would also be possible to include a source of infra-red such as a resistance wire within the decoy itself to simulate vehicle emissions. The source could be activated at the same time.

In the case of ships a longer tube or tube bundle is required. The length can be 40 meters. At each end there can be passive or active decoys but the tube(s) should be capable of increased manoeuvrability because they do not necessarily have to be anchored into the water, although if required because of underwater decoy purposes a Hapa or Sea Anchor could be attached to the end of the above water decoy system to act as a remotely controlled (e.g. through fibre optics) underwater platform for decoys, sonar buoys and mine detection equipment etc. The decoy system could be deployed quickly and accurately to a specified distance and height to seduce incoming missiles etc., away from the vessel, vehicle or plane by means of a swivelling base which allows the inflated tube(s) to be deployed in one position and then to move away from the vessel or vehicle or plane. By use of structures of this invention, increased hoop and tensile strength is generated enabling much higher pressures to be used, typically 100-150 $7 \times 10^5$ to $13.5 \times 10^5$ $Nm^{-2}$ PSI for 6"-4" (150 mm to 100 mm) tubing coupled with the lightness of material which typically could be as little as 250 gms per sq.meter.

Another use for tubes made by the invention is in a tripod or single tube system for hazard warning, illumination and surveillance, or the like. A single tube of not more than 4" (100 mm) in diameter can be erected with three guy ropes to a height of at least 24 ft 7.2 m without distorting in winds of Force 8-9 even when a lightweight video camera and/or signs or searchlight are affixed at the top.

A number of tubes can be attached together by weaving tubes of the reinforcement material together at original manufacture. These tubes (which can be of the same or different diameters) then can have an envelope fitted within each outer tube before sealing the ends and adding the settable material to give a combination tube with greater load carrying capacity than the sum of each individual tube.

Particular applications where this invention will be of use are: inflated water-going vessels which have hulls built from different sizes of tubes. The hull can have a good hydrodynamic form and built in safety; temporary and permanent buildings where a secondary tube can be added as a safety precatuion in a main span structure; crash barriers either temporary or permanent. Impact and abrasion resistance can be imparted by Spectra fibres. The barrier can be segmented with relief valves in each segment which release pressure on impact to stop the vehicle being bounced back into its own srtream of traffic or breaking through the barrier into oncoming traffic.

A crash barrier tubular system could be affixed by way of example to existing stanchions to form a permanent barrier or to the road by means of adhesive pads.

This invention could therefore be a help in overcoming the recent spate of accidents where vehicles have gone through the cones in contra flow systems during temporary repairs on motorways etc.

It is a further object of this invention that the same type of tubular system could by way of a further example be used as a barrier to form an ice rink, swimming pool or water enclosure. Ice skates would have difficulty in penetrating the reinforcement fabric. Internal pressure means that small diameter tubes are sufficiently strong to act as a barrier against the pressure of water.

Temporary, semi-permanent or permanent buildings can now be constructed in such a way that interconnecting purlins can be left out even in reasonably large spans providing that by way of example triangulated tension cords are used to ensure the integrity of the building.

This method of constructing modular or individual buildings or other structures is only possible if the inflated arches used have a high compressive and tensile strength which can only be obtained with materials with a particularly high tensile strength such as Spectra or Kevlar which in turn allow an inflated tube to be constructed with a high internal pressure because of the hoop strength.

This invention therefore makes it possible to construct larger buildings with greater spans and smaller diameter tubes than has hitherto been possible.

A tubular structure can be used to drag an underwater decoy or mine detector. It is possible for a vessel to operate at greater speeds and with increased manoeuvrability because drag is reduced in comparison to towing an underwater cable to which the decoy or mine sweeping equipment is attached.

The invention will be described further by way of example with reference to the accompanying drawings wherein:

FIG. 1 is a perspective view of a first structure made by a preferred method of the invention;

FIG. 2 is a perspective view of three tubes of unequal diameter such as might be used for a multihull vessel;

FIG. 3 is an end view of an inflatable Fascine;

FIG. 4 is a side view with a cut out showing the individual tube and cover layout;

FIGS. 5 and 6 show a schematic and cut out perspective view respectively of a decoy system without a Hapa (Sea Anchor) and the other with the Hapa;

FIGS. 7, 8, 9 and 10 are different views of a modular rectangular building system using inflated arch tubes;

Figure 1A:
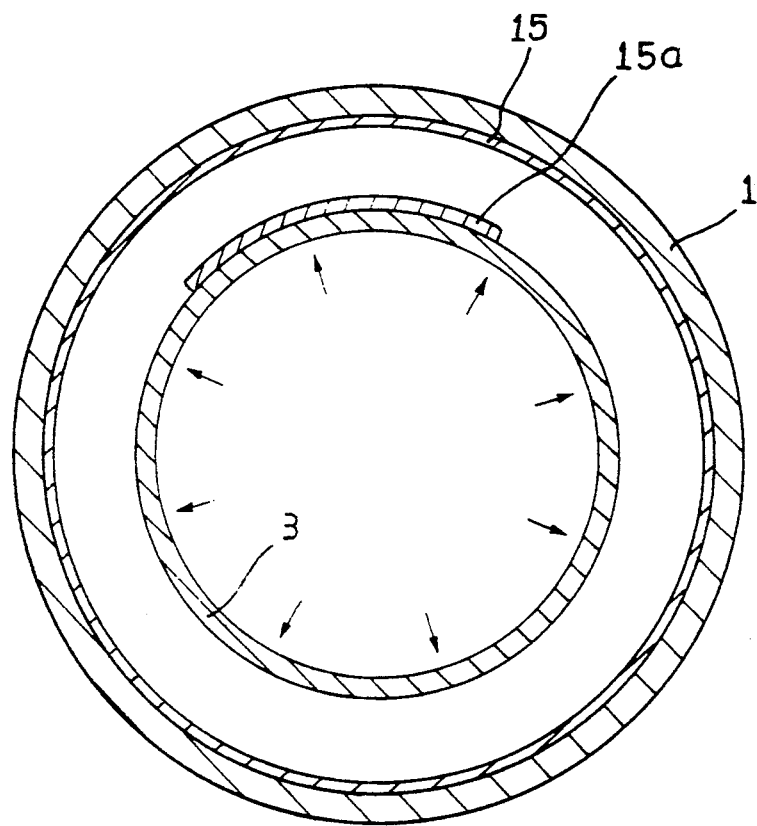
FIG. 1a is an enlarged cross-section view through the tube of FIG. 1.

A first preferred method of manufacturing the inflatable products according to the invention is shown typically in FIGS. 1 and 1a in that a gas-impermeable envelope in the form of a tube (3) is shown disposed within an outer reinforcement shell in the form of a surrounding 1 tube of a textile material made from high tensile strength material such as an extended chain polyester known commercially as Spectra or an aramid known commercially as kevlar. A combination inlet and exhaust valve (not shown) or a separate inlet valve (5) and exhaust valve (6) are provided.

The tube (3) is sealed at both ends and, highly flexible or relatively non-flexible settable adhesive material (15) (depending on whether the product is to be extremely flexible or relatively rigid when deflated) is brushed, sprayed or otherwise coated in its fluent state onto the inner surface of the outer tube (1). Between tube (3) and outer tube (1) is inserted at each end an end cap (4) manufactured in the same or similar material as is used for the outer tube (1). The envelope is then inflated to sandwich the adhesive between the envelope and the shell and the adhesive allowed to set or cure to unite the shell, end cap and envelope.

Depending upon the chemicals used in its manufacture the settable material (15) will set within a few minutes or hours of finishing and the product can be blown up to its full pressure after full curing has taken place. Surprisingly it has been found that with certain settable materials (15) a bond is formed between the outer tube (1) and inner tube (3) and the settable material (15) also stops creep in certain woven material which have that problem.

When a two part adhesive is used, one component 15 can be on the envelope 3 and the other 15a can be on the reinforcement 1.

In FIG. 2 a three tube (18) (19) and (20) system of unequal diameter are joined at (9) and (10) by weaving or braiding outer high tensile tubes (2) together at manufacture. However, in larger diameters the individual tubes may have to be sewn together rather than woven because of the width of material.

An outer skin (14) of high tensile woven material or possibly in certain cases a more flexible material is layed outside the settable material (15) either whilst the settable material (15) is still in its fluent state or after it has cured depending upon the purpose of the product so created. At certain points (11) (12) (13) or over the whole outer skin so created (14) a further coating of the settable material (17) is applied to bond (14) to each individual tube (18) (19) and (20). Each tube (18) (19) and (20) has a connection (21) (22) (23) to a manifold (7) which has a combined inflation exhaust valve (8).

A non return valve (not shown) could however be incorporated into the connectors (21) (22) and (23) to ensure that should one of the individual tubes (18) (19) and (20) suffer damage from any cause the inflatable product would not collapse.

Such a three tube system as shown in FIG. 2 could be used to create a multihull and by so doing either with or without the outer skin (14) it would form a good hydrodynamic form to give leeward resistance against the sail or kite force thereby obviating the need for a centre or lee board.

By altering the size and number of individual tubes many products can be created such as aeroplane or RPV wings (not shown) and sails (not shown) which have a good aerodynamic shape or crash barriers (not shown). Crash barriers can be affixed either to the present stanchions or to cats eye holders or which have adhesive pads to attach the barrier to cement or tarmac for permanent or temporary systems on motorways and contraflow systems etc.

A further example of this is given in FIGS. 3 and 4 where a number of tubes (24) (25) (26) (27) (28) (29) and (30) of equal diameter and made accordingly to the method of FIGS. 1 and 2 are jointed either by sewing, weaving, knitting or by the addition of a settable material and smaller diameter tubes (31) (32) (33) (34) (35) (36) are interspaced inside the outer skin (37) to reduce the air gap (38) in order to form either the inflatable inner core or a completely inflatable Fascine over which heavy trucks and tanks can pass.

The outside small diameter tubes (31) (32) (33) (34) (35) and (36) are of equal diameter and can again be joined to the larger diameter tubes (24) (25) (26) (27) (28) (29) (30) by various methods as previously shown and the outside skin (37) of high tensile abrasive resistance material can be joined to all the outside tubes (24) (25) (26) (27) (28) (29) (30) (31) (32) (33) (34) (35) and (36) by a settable material or by weaving, knitting or sewing etc., as previously shown.

All the tubes are linked by a common manifold (not shown) for inflation and deflation through a connector (not shown) and inflation/deflation valve. A secondary deflation system (not shown) can be added to the opposite end of the Fascine for quick deflation if required. In FIGS. 5 and 6 schematic and cut away perspective view respectively are shown of a decoy system which uses inflatable tube(s) (37a) made in accordance with FIGS. 1 and/or 2, to lift a decoy (41) or decoys (41) using a pump, air pressure hose or pressurised air cylinder (not shown) to inflate the tube(s) (37a).

The tube(s) (37a) are attached to a winch (38a) which only reels the tubes (37a) back in again because inflation is designed to occur very rapidly and in the deflated state before deployment the tube(s) (37a) are reeled around a spindle (43) between or at the side of the decoy(s) (41) in order for inflation to deploy the decoy(s) (41) much in the same manner as a child's party blower. A turntable (39) is fixed to the vessel (40) which is capable of rotating a minimum of 90° in pan and 30° in tilt in order to seduce any incoming missile away from the vessel.

This type of decoy system is not limited to vessels but could equally well be installed in aircraft and land vehicles but with less problem because the length of tube(s) is unlikely to be as long and the decoy itself does not have to give as large a radar or infra red signal.

The tube (37a) is composed of three individual tubes (not shown) to give it greater strength to enable it to be deployed to greater distances but in the case of FIG. 5 the decoy (41) is kept above the sea (42) by the tilt mechanism (not shown) on the turntable (39) at a height suited to the vessel's main infra red and/or radar emissions whereas in FIG. 6 a Hapa or Sea Anchor (46) is attached by adding an inflated down tube (44) and hydrodynamic body (45) which could be inflated or not as required. The height of decoy(s) could be altered by increasing or decreasing the length of hydrodynamic body (45) or inflated down tube (44) and the position of the decoy(s) (41) in relation to the ship (40) can be altered by incorporating a steering mechanism (not shown) in the Hapa or Sea Anchor (46) rather than by the mechanical turntable (39). The turntable (39) could therefore be freely rotating rather than mechanically driven (not shown) as in the case of FIG. 5.

The Hapa or Sea Anchor (46) could incorporate a decoy system (not shown) or mine detection equipment (not shown) similar to a minesweeper but it would enable the vessel (40) to be more manoeuvrable than with conventional towed equipment because there would be less drag and power loss due to the fact that there is no cable being dragged through the sea (42).

In FIGS. 7, 8, 9 and 10 which are respectively side view, end view, plan view and perspective, a modular rectangular building system is shown which incorporates a number of inflated tubular arches (47) all made as tubes in accordance with FIGS. 1 and/or 2. The arches (47) can vary in span according to diameter of tube and inflation pressure but typically would only be six inches (or 150 mm) for a span of 10 meters or more, with an internal inflation pressure of less than 35 PSI ($2.45 \times 10^5$ $Nm^{-2}$) whereas a building of 30 meter span would require in the order of 300 mm and an internal pressure of approximately 30 PSI 2.1 $Nm^{-2}$.

Joining the inflated tubular arches (47) are a series of interconnecting triangulated tension cords manufactured from Spectra or a similar relatively non extensible material such as kevlar which are triangulated to form a building framework on which can be attached many different types of cladding such as a U.V.stabilised polythene known as ICI Visqueen for a greenhouse either only on the outside or on the inside as well to give better thermal protection.

Other suitable material such as a cross lamination polypropylene known as reedex F and PVC laminates etc., could be used for other types of buildings and for a relatively vandal proof lower section the extended chain polyester known as Spectra could be used which is a ballistic material and extremely difficult to puncture and cut with ordinary knives, scissors etc. The cladding (not shown) could be attached by means of plastic velchro (not shown) or maxigrip (not shown) on the tubular fraemwork (47).

The side tensioning cords (48) are clipped at (49) to triangulate the system and similarly the roof cords (50) are triangulated at (51). At eave height there is further triangulation of cords (55) and (56) and cords (53) on both sides of the building framework and (52) at the uppermost point of the building run lengthwise along the complete module.

A number of modules made up of similar rectangular buildings as depicted in FIGS. 7, 8, 9 and 10 can be joined either end to end or side by side as required to form a larger complex. The building is anchored into position by means of footpads (54) which can be staked into the ground for temporary buildings or cemented in position for permanent or semi permanent erections and at each end of the modular building guy ropes (not shown) can be anchored to the ground from the eaves and uppermost part of the building.

If required a wooden or similar floor board arrangement (57) can be laid down and doors (58) can be set into the end arch as required. Lighting (not shown) can be installed along the arches and between arches and natural lighting can be obtained from skylights made up from clear material such as ICI Visqueen - PVC or polyurethane which are attached in between arches in place of the opaque material. Ventilation can also be installed in the form of air conditions (60) or opening panels as necessary simply by forming a tubular structure (59) into which the air conditioner (60) is inserted before inflation. Each inflation point (58) on the arches can be connected if required by a connection tube (61) either with or without a non return valve as necessary.

Figure 11:
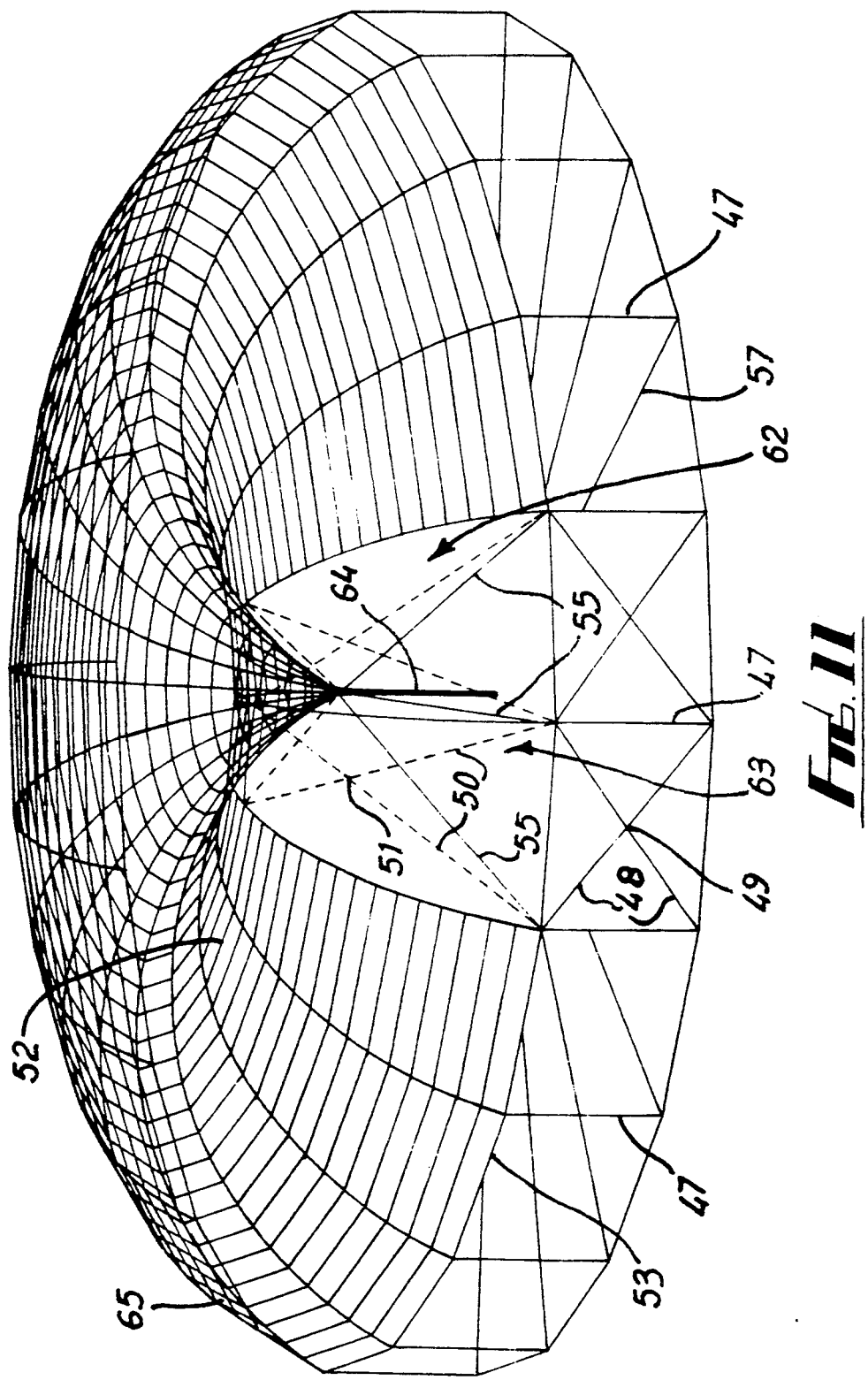
FIG. 11 is a hemispherical building using exactly the same modular arches as in FIGS. 7, 8, 9 and 10 but altering the tension ropes and cladding.

In FIG. 11 an alternative modular system is shown using exactly the same inflated tubular arch (47) as is used in FIGS. 7, 8, 9 and 10 (made in accordance with the method described in relation to FIGS. 1 and/or 2). However, tensioning cords which in all cases are clipped into position (not shown) and cladding has in certain positions to be changed or removed whilst in others it remains exactly the same.

For clarity the cladding panels (65) have been removed from (62) and (63) to show the differences in tensioning cords and cladding panels (65) are generally affixed by velchro or some other similar method (not shown) as individual panels or multiples of single panels.

The building forms a hemisphere using four modules of the same dimensions as the rectangular building as depicted in FIGS. 7, 8, 9 and 10 and in the centre (64) the arches (47) are joined by holding bands (not shown) to ensure rigidity.

Half of the cords (55) are removed and no triangulating points (56) occur or are necessary.

One half of the cords (50) on the outside segment remain the same length but the other half of cords (50) on the inside segment are reduced in length and although cords (48) remain the same on the outside there are no cords (48) on the inside at (64).

However the remaining cords (48) and all the cords (50) can be triangulated at (49) and (51) respectively. The building as shown in FIG. 11 has no need of end guy ropes but has cords (52) and (53) around the building although (52) will be shorter than in the rectangular building as shown in FIGS. 7, 8, 9 and 10 whilst (53) will remain the same.

Cladding (65) will be different on the roof section but the same on the outside, and there is no need for inside cladding at (64) from eave height. Although drainage (not shown) will have to be provided possibly under the floor panels (57).

Figure 12:
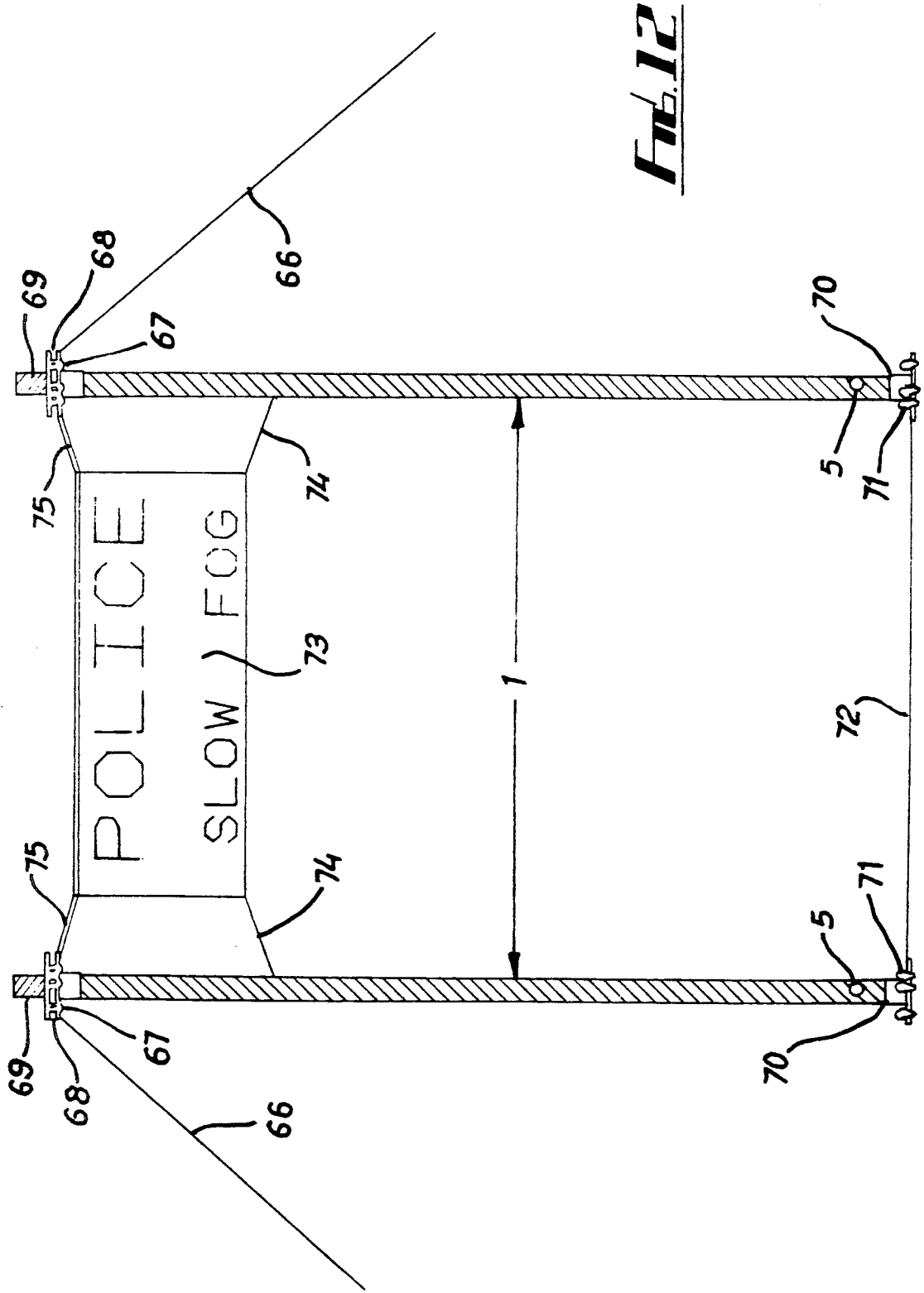
FIG. 12 is a tubular warning and illumination system for use on highways which can also be used to carry elevated surveillance equipment.

In FIG. 12 two units of inflatable tubes (1) are shown with a metal or plastic end cap (67) on which is mounted a base plate (68) on top of which in the diagram is mounted a blue Police warning signal lamp (69).

The inflated tube (l) is inserted into a footpad (70) through which are driven pegs (71) to fix the tubes (1) in position.

To each end cap (67) are attached two guy ropes (66) which are staked to the ground (not shown) and in between the two inflated tubes (1) can be strung message banners (73) such as is depicted here with the fog warning. This warning banner (73) can be illuminated by means of a wire conduit (75) from the same battery (not shown) as is used to power the blue warning lamp (69).

The warning banner (73) is held fast between the two inflated tubes (1) by guy ropes (74) from the top and bottom of the banner. The purpose of the warning system as shown in FIG. 12 is to straddle the road to give more impact and typically the height is 6.40 m in order to clear the maximum permissable height of vehicles whilst the diameter of tube is only 4" (100 mm).

However, the same tubes (1) with end cap (67) and base plate (68) can have mounted camera systems (not shown) or other surveillance equipment, search lights (not shown) to aid in rescue on motorways etc., and are designed as a modular system whereby one or more can be used as required needing only to add a third guy rope (not shown) if used as a stand alone system.

The invention is not limited to the foregoing and variations can be made thereto and by way of example in FIG. 1 the end cap (4) could be woven, knitted or sewn as an integral end to outer tube (1) at one end before inserting the envelope tube (3) and sealing the other end by inserting end cap (4) and using a settable material to seal it to the tube (3).

A further variation is that both end caps (4) could be woven, knitted or otherwise joined to tube (1) as an integral piece whilst at the same time having a small opening along the length of tube (1) to insert tube (3) before sealing the opening (not shown) by inserting some woven material (not shown) and using a settable material to bond it to the outside tube (1). Another variation would be to manufacture a product not in the form of a tube, but using a woven cloth of Spectra or Kevlar to enclose a preformed product manufactured with an impervious material to gas by wrapping it around the inside impervious material and bonding it to the said impervious vessel by using a settable material and overlapping the outside high tensile material.

Although structures of the invention are normally intended to be repeatedly inflated and collapsed, variations can be made to this. For example one or more parts of the structure can be made rigid by incorporation of ribs or comparable reinforcement to provide a structure part rigid and part-deflatable. By using different types of adhesive a structure with different degrss of flexibility can be formed. If desired, a structure formed by the method of the invention can be filled with a rigid or flexible foamed plastics and/or rubber material to form a stronger structure or a structure proof against puncture (as for vessels).

As mentioned previously although bodies, such as tubes, made in accordance with the invention do not have to be parallel tubes of constant length but can be tapered as a cone or as a pyramid or a truncated version of these items. A tube shaped in the form of a boat hull can be manufactured using an appropriately shaped outer shell.

In a structure which includes a plurality of adjacent hollow bodies, respective shells for those hollow bodies can be manufactured simultaneously, for example by being woven, knitted or similarly formed as textile members, the envelopes then being placed within appropriate pockets or spaces within the envelopes and then inflated.

Further, where a structure includes a plurality of articles made in accordance with the invention, for example a plurality of tubes secured together, such securement can be effected by adhering parts together, or by fastening the parts together using re-closable fasteners such as touch and close fasteners sold under the trade marks VELCRO and KRIC-KRAC.

The reinforced shell can entirely surround the envelope. The shell can be tubular. The adhesive can be provided on the envelope. The adhesive can be a two part adhesive, one part being provided on the shell and one on the envelope. The envelope can be of polyurethane, a nylon-polyurethane mixture, or of natural or artificial rubber.

The decoy of the invention can include an aerial.

It is also possible to form reinforcement material to define a pair of shells, placing an inflatable envelope within each shell and expanding each envelope to form a pair of articles intrinsically secured together. The reinforcement can be of textiles material woven or otherwise formed to define the two shells. The shells can include glass or carbon fibres.

Many other variations are possible within the scope of the following claims.

I claim:

1. A method of making an article including the steps of: providing a gas impermeable inflatable envelope, positioning the envelope within an at least partially surrounding flexible preformed shell of flexible reinforcement material, positioning a flexible adhesive between the envelope and the shell, and then expanding the envelope to fill the shell to cause the adhesive to form a bond between the envelope and the shell and allowing the adhesive to cure to form a permanent flexible bond between the envelope and the shell; wherein the shell includes a flexible body and a flexible end cap having a skirt portion; and the end cap is secured by positioning at least a part of the skirt portion thereof between adjacent end portions of the shell body and the envelope and allowing the flexible adhesive to unite the cap with the flexible shell body and the envelope while the skirt portion of the cap is sandwiched therebetween.

2. A method as claimed in claim 1 wherein the reinforcing shell body is tubular.

3. A method as claimed in claim 1 wherein the shell body only partially surrounds the envelope.

4. A method as claimed in claim 1 wherein the adhesive is provided on the envelope.

5. A method as claimed in claim 1 wherein the adhesive is provided on the shell body.

6. A method as claimed in claim 1 wherein the adhesive is a two component adhesive, a first component being provided on the shell body and a second part being provided on the envelope, the two parts being brought into reacting engagement upon expansion of the envelope within the shell body.

7. A method as claimed in claim 2 wherein an end cap is provided at each end of the tube.

8. A method as claimed in claim 1 wherein the envelope and the shell body are in the form of preformed tubes.

9. A method as in claim 1 wherein the adhesive is a flexible epoxy resin or a flexible polyurethane resin.

10. An inflatable body made by the method of claim 1 and inflated to a pressure of one hundred pounds per square inch ($>7\times 10^5$ Nm$^{-2}$) or more.

11. A method as claimed in claim 1 wherein attached reinforcement is incorporated in the shell body.

12. A method as claimed in claim 11 wherein the reinforcement is attached to the shell body.

13. A method as claimed in claim 12 wherein reinforcement is in the form of ribs attached to the shell body.

14. A reinforcing rib for a structure comprising an elongate tube formed into an arch, the tube being constructed according to the method of claim 1.

15. A repeatedly inflatable and deflatable article made by the method of claim 1.

16. A body according to claim 10 and provided with a further outer protective coating.

17. An article made by the method of claim 1 and filled with a foamed material.

18. A method as claimed in claim 1 including the further steps of securing the article using a releasable fastener.

19. A method as claimed in claim 18 wherein the releasable fastener is a touch and close fastener.

20. A method as claimed in claim 1 including the steps of forming flexible reinforcement material to define a pair of shells, placing an inflatable envelope within each shell, engaging an end cap with each shell, and expanding each envelope to form a pair of articles intrinsically secured together.

* * * * *